United States Patent [19]
Soichi et al.

[11] Patent Number: 4,891,875
[45] Date of Patent: Jan. 9, 1990

[54] METHOD FOR MANUFACTURING A PISTON FOR AN INTERNAL COMBUSTION ENGINE

[75] Inventors: Hara Soichi; Hiroshi Kageyama, both of Toyota, Japan

[73] Assignee: Aisin Seiki Kabushiki Kaisha, Kariya, Japan

[21] Appl. No.: 245,899

[22] Filed: Sep. 19, 1988

[30] Foreign Application Priority Data

Sep. 17, 1987 [JP] Japan ................................ 62-233151
Feb. 12, 1988 [JP] Japan ................................ 63-017952

[51] Int. Cl.[4] ................................ B23P 15/10
[52] U.S. Cl. ................................ 29/156.5 R; 29/527.3; 29/559; 92/158; 92/176; 123/193 P; 164/340
[58] Field of Search ............... 29/156.5 R, 423, 527.1, 29/527.2, 527.3, 559; 92/158, 159, 174, 176, 212; 123/193 P; 164/30, 31, 32, 132, 340; 264/221, 275, 277, 317

[56] References Cited

U.S. PATENT DOCUMENTS

| | | | |
|---|---|---|---|
| 3,991,811 | 11/1976 | Diez et al. | 164/121 |
| 4,361,181 | 11/1982 | Wischnack et al. | 164/522 |
| 4,506,632 | 3/1985 | Kanda et al. | 123/193 P X |
| 4,586,553 | 5/1986 | Allen et al. | 164/30 |
| 4,599,936 | 7/1986 | Bedwell et al. | 29/156.5 R X |
| 4,614,219 | 9/1986 | Anderson et al. | 164/340 X |
| 4,643,078 | 2/1987 | Ban | 92/212 |
| 4,776,075 | 10/1988 | Kawabata et al. | 29/156.5 R |
| 4,785,774 | 11/1988 | Tokoro | 123/193 P |

FOREIGN PATENT DOCUMENTS

| | | | |
|---|---|---|---|
| 166158 | 8/1985 | Japan | 164/30 |
| 1446 | 1/1986 | Japan | 164/30 |

OTHER PUBLICATIONS

Charles Herb, "Forging Aluminum Aircraft Pistons on Mechanical Presses", Machinery, Nov. 1945, pp. 149-152.

*Primary Examiner*—Timothy V. Eley
*Assistant Examiner*—Peter Dungba Vo
*Attorney, Agent, or Firm*—Burns, Doane, Swecker & Mathis

[57] ABSTRACT

A method of manufacturing a piston of an internal combustion engine includes holding a soluble core to a plurality of first projection portions and a plurality of second projection portions and a plurality of third projection portions formed in a pair of straight portions of a strut member for preventing thermal expansion of the piston. The first projections have a bent portion bent outwardly so as to be along an inner face of the soluble core and the second projection portions have a curved holding portion bent inwardly so as to be along a lower surface and inner surface of the soluble core. By holding the strut member and the soluble core in the piston, the soluble core is melted away and an oil-cooling gallery is formed by pouring water into the mold.

10 Claims, 4 Drawing Sheets

METHOD FOR MANUFACTURING A PISTON FOR AN INTERNAL COMBUSTION ENGINE

BACKGROUND OF THE INVENTION

1. Field of the Invention

The present invention relates to a method for manufacturing a piston for an internal combustion engine, and in particular to a method for manufacturing a piston for an internal combustion engine which forms an oil-cooling gallery portion by a soluble core.

2. Description of the Prior Art

A conventional method for manufacturing a piston of the foregoing type is disclosed, for example, in Japanese Application Laid-Open Publication No. 60-166158 published on Aug. 29, 1985. Therein, the circumference of a top-ring groove is reinforced by an aggregate of inorganic fiber or a porous metal and a soluble core is adhered to an inner side of the aggregate of the inorganic fiber as a strength or reinforcing member in order to form an oil-cooling gallery portion near the top-ring groove. The lower part of the soluble core has pinholes and the upper part of the punch mold has three poles. A pin is formed at the top of the poles and is inserted in the pinhole of the soluble core. In this condition, the soluble core is held in the punch mold and is inserted in the casting mold. After the casting, the soluble core is melted and the oil-cooling gallery is formed.

In the prior art, however, since the soluble core is held in the punch mold and the aggregate of the inorganic fiber is fragile, the aggregate of the inorganic fiber sometimes is broken upon the casting and the aggregate of the inorganic fiber adheres to the soluble core. Therefore, the quality of the piston deteriorates, and X-ray inspection of the piston is necessary to determine flaws. The above drawback can be prevented by the use of a porous metal. However, the porous metal is expensive and, therefore, the manufacturing cost of the piston is increased.

SUMMARY OF THE INVENTION

It is, therefore, an object of the present invention to improve the productivity of the piston.

It is another object of the present invention to decrease the manufacturing cost of the piston.

It is further object of the present invention to decrease the weight of the piston.

It is further object of the present invention to provide an improved method for manufacturing a piston of an internal combustion engine which comprises holding a soluble core to a plurality of first projection portions and a plurality of second projection portions formed in a strut member for preventing thermal expansion of the piston. The first projections have a bent portion bent outwardly so as to be along a face of the soluble core, and the second projection portions have a cutting portion. The strut member is cast by holding the soluble core in the piston after setting the strut member inside or radially interiorly of an aggregate of the inorganic fiber disposed in a lower mold. A circumference of a top-ring groove is reinforced by complex-reinforcing the aggregate of the inorganic fiber and melting away the soluble core cast in the piston for forming an oil-cooling gallery by pouring water therethrough.

It is further object of the present invention to provide an improved method for manufacturing a piston of internal combustion engine which comprises holding a soluble core to a plurality of first projection portions and a plurality of second projection portions and a plurality of third projection portions formed in a pair of straight portions of a strut member for preventing thermal expansion of a piston. The first projections have a bending portion bent outwardly so as to be along an inner face of the soluble core, respectively and the second projection portions having a curved-holding portion bent inwardly so as to be along a lower surface and inner surface of the soluble core, casting the strut member holding the soluble core in the piston and melting away the soluble core cast in the piston so as to form an oil-cooling gallery by pouring water therethrough.

BRIEF DESCRIPTION OF THE DRAWINGS

Additional objects and advantages of the present invention will become more apparent from the following detailed description of preferred embodiments thereof when considered with reference to the attached drawings, in which.

DESCRIPTION OF THE PREFERRED EMBODIMENT

A method for manufacturing a piston for use in an internal combustion engine in accordance with a preferred embodiments of the present invention will be described with reference of the drawings.

Figure 1:
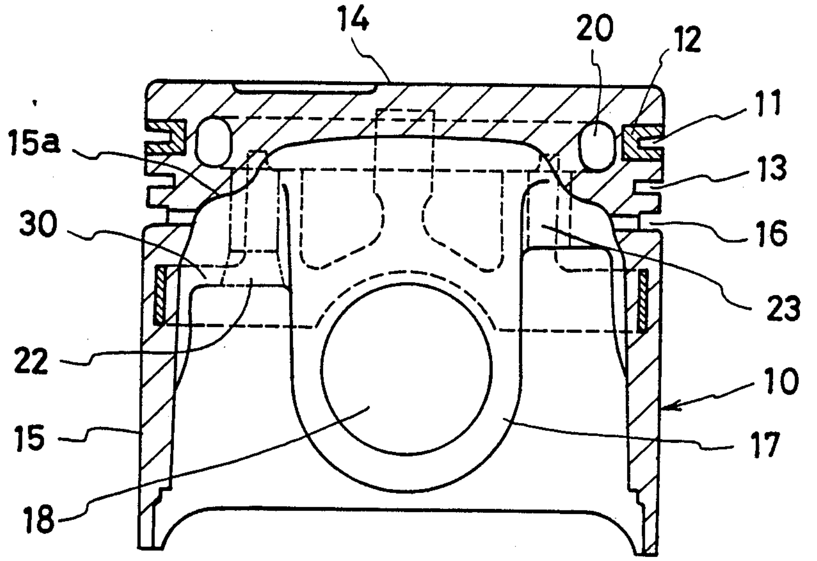
FIG. 1 shows, a vertical cross-sectional view of a piston manufactured/by a method according to the present invention.
Figure 2:
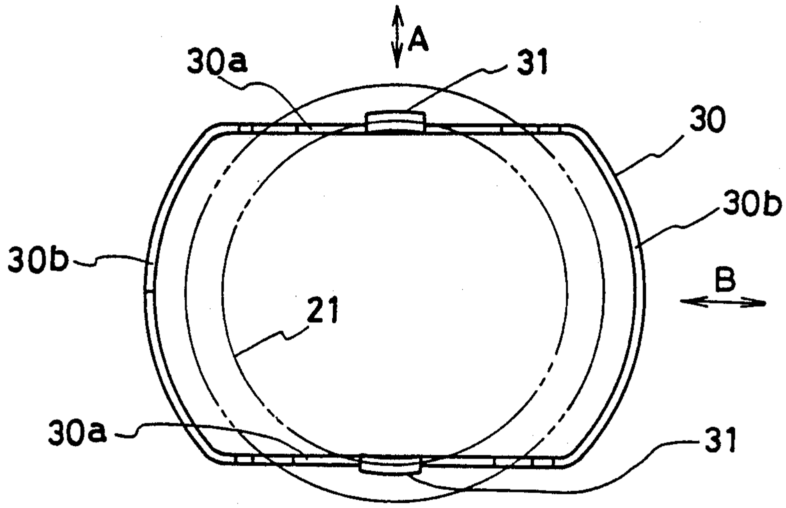
FIG. 2 shows a plane view of a strut member holding a soluble core in a method according to the present invention.

Referring to FIG. 1 and FIG. 2, a piston 10 is formed by high-pressure casting and is provided with a head portion 14, a skirt portion 15, a pin-boss portion 17 and a hole 18. A top-ring groove 11, a second-ring groove 13 and an oil-ring groove 16 are formed on an outer surface of the head portion 14. The top-ring groove provides a complex-reinforcement of the basic material of aluminum with an aggregate of inorganic fiber 12. A circular oil-cooling gallery 20 is formed in the head portion 14 adjacent an interior region of the top-ring groove 13. The oil-cooling gallery 20 is in communication with an oil-inlet port 22 and an oil outlet port 23, respectively. A strut member 30 of cast metal is provided in the piston 10 in order to prevent thermal expansion of the piston 10 and supports a soluble core 21 such as a salt core for forming the oil-cooling gallery 20 by casting.

Figure 3:
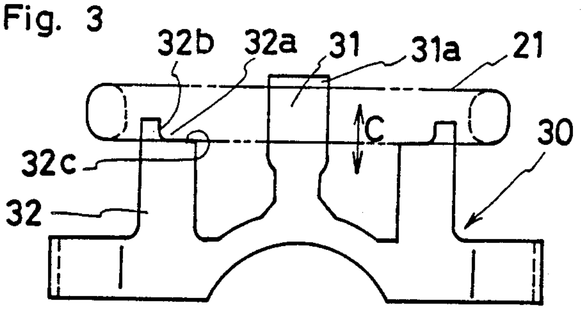
FIG. 3 shows a front view of FIG. 3.

Referring to FIG. 2 and FIG. 3, the strut member 30 is made of steel plate and has a plurality of first projection portions 31, each having a bent portion 31*a* bent outwardly at an end so as to be partially co-extensive with a face of the soluble core 21 and a plurality of second projection portion 32, each having a cutting portion 32*a*. The strut member 30 includes a pair of straight portions 30*a* and a pair of circular arc portions 30*b*. The circular arc portions 30*b* are positioned in the direction and adjacent the skirt portion 15. Each projection portion is provided in the straight portions 30*a* so as to prevent an increase in the thickness of the skirt-shoulder portion 15*a*. The cutting portion 32*a* of the second projection portions 32 is provided with a first cutting surface 32*b* extending in the axial direction of the piston 10 and a second cutting surface 32*c* extending in the radial direction, with respect to the head 14, of the piston 10, respectively. In the casting, the soluble core 21, which forms the oil-cooling gallery 20 is installed on the strut member 30 by a snap fit. The first projection portions 31 are engaged with an inner surface of the soluble core 21 and the second projections 32 are engaged with an outer surface of the soluble core 21. The soluble core 21 is held in this position as determined by the first projection portion 31 in the direction indicated by the Arrow A and is held by the first cutting surface 32*b* of the cutting portion 32*a* of the second projection portion 32 in the direction indicated by the Arrow B. Further, the soluble core 21 is held by the second cutting surface 32*c* of the cutting portion 32*a* of the second projection 32 in the direction indicated by the Arrow C (FIG. 3).

Figure 4:
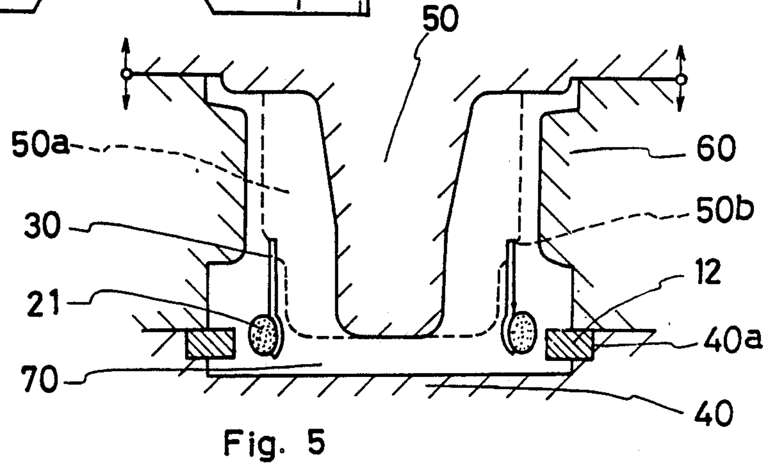
FIG. 4 shows a cross-section view of the completed assembly in a casting mold in accordance with the method of the present invention.

In the casting, the soluble core 21 is positioned on each projection portion of the strut member 30 and inserted to an inside of the aggregate of the inorganic fiber 12 which is set in an annular groove 40*a* of a lower mold 40 (FIG. 4). The soluble core 21 is positioned so as to avoid contact with the aggregate of the inorganic fiber 12 by setting the strut member 30 in a position setting portion 50*b* of a mold 50*a* forming a punch mold 50 as shown in FIG. 4. A sliding mold is indicated at 60 and the sliding mold forms a cavity 70 with the punch mold 50 and the lower mold 40.

By the pouring of hot water into the cavity 70 under this condition, the aggregate of the inorganic fiber 12 is cast without being broken during the pouring, whereby an inner circumference of the top-ring groove 11 is reinforced and whereby both the soluble core 21 forming the oil-cooling gallery 2 and the strut member 30 fixing the soluble core 21 are casted.

After the casting, an oil inlet port 22 and an oil outlet port 23 are formed in the piston 10 so that the both ports 22, 23 face the soluble core 21. By the pouring of water in the oil inlet port 22, the soluble core 21 will melt and the oil-cooling gallery 20 will be formed. In an outer circumferential surface of the piston 10, the top-ring groove 11, the second-ring groove 13 and the oil-ring groove 16 are formed by a cutting process.

According to this embodiment, the position of the soluble core 21 is determined relative to the position of the aggregate of inorganic fiber 12 by the projections of the strut member 30 in the casting and breakage of the aggregate of the inorganic fiber 12 to form the oil-cooling gallery 20 with respect to the top-ring groove 11 is prevented. Thereby the cooling efficiency of a circumference of the top-ring groove is improved. Further, since the projections of the strut member 30 are not cast in the skirt-shoulder portion 15*a* of the piston 10, the method decreases the weight of the piston 10 by deleting unnecessary thickness of the portion 15*a* of the piston. Since the thickness of the skirt-shoulder portion 15*a* is reduced, an increase of the hardness of the skirt-shoulder portion 15*a* prevents scuffing or marring of the skirt-shoulder portion 15*a*.

Figure 5:
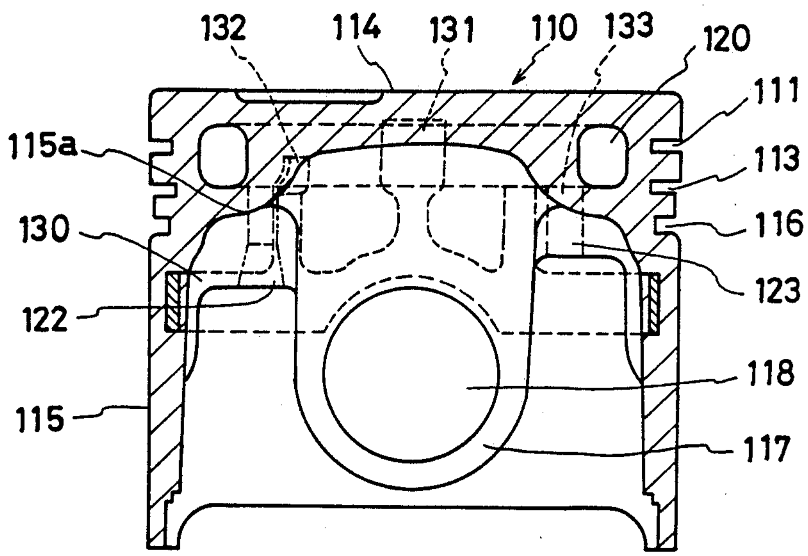
FIG. 5 shows a vertical cross-sectional view of a piston manufactured by another method according to the present invention.

FIG. 5 shows another piston 110 manufactured by another preferred embodiment of the present invention. In FIG. 5, a piston 110 is formed by high-pressure casting and is provided with a head portion 114, a skirt portion 115, pin-boss portion 117 and a hole 118. A top-ring groove 111, a second-ring groove 113 and an oil-ring groove 116 are formed on an outer surface of the head portion 114 of the piston 110. A circular oil-cooling gallery 120 is formed adjacent and radially inwardly of the top-ring groove 111 in the head portion 114. The oil-cooling gallery 120 is communication with an oil-inlet port 122 and an oil-outlet port 123 which are formed in the piston 110 in order to circulate the oil provided from oil jet nozzle (not shown) in the oil-cooling gallery 120.

Figure 6:
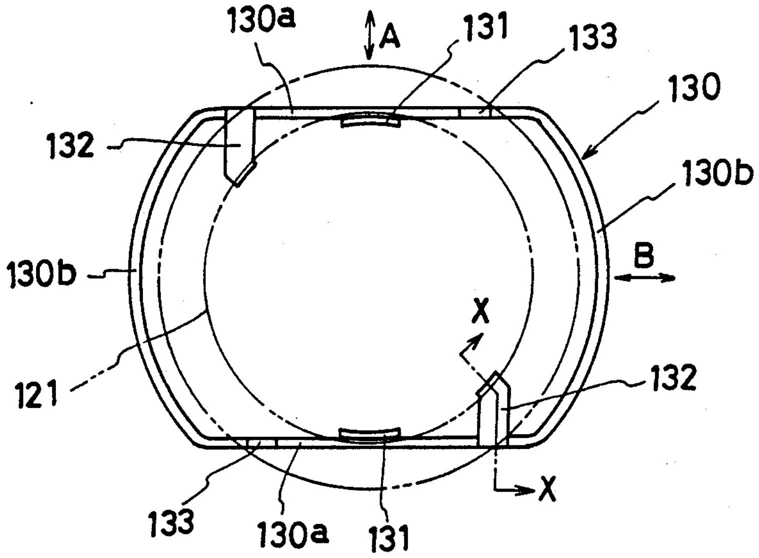
FIG. 6 shows a plane view of a strut member holding a soluble core in accordance with the method of FIG. 5 according to the present invention.
Figure 7:
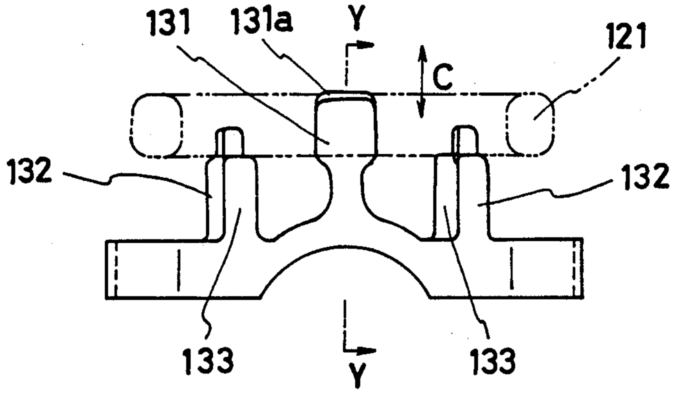
FIG. 7 shows a front view of FIG. 5.
Figure 8:
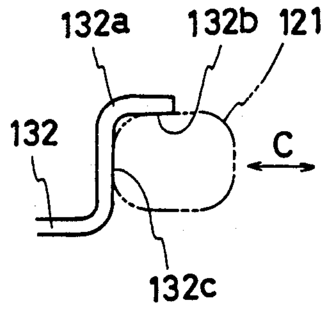
FIG. 8 shows a sectional view taken substantially along the line A—A of FIG. 5.
Figure 9:
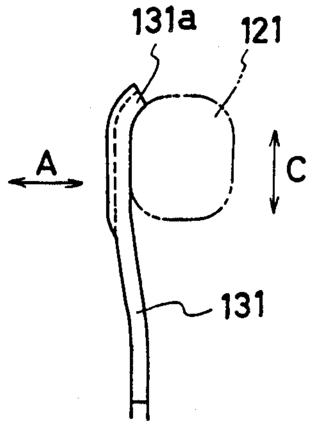
FIG. 9 shows a sectional view taken substantially along the line B—B of FIG. 6.
Figure 10:
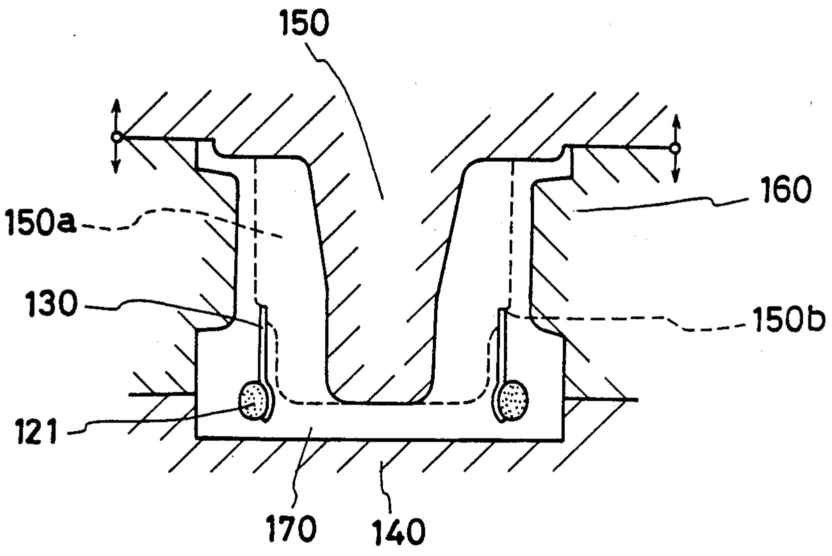
FIG. 10 shows a cross-sectional view of the completed assembly in casting mold in accordance with the method of the present invention.

A strut member 130 is cast metal in the piston 110 in order to prevent the thermal expansion of the piston 110 and holds a soluble core 121 for forming the oil-cooling gallery 120 by casting as shown by FIG. 6 and FIG. 7.

Referring to FIG. 6, FIG. 7, FIG. 8 and FIG. 9, the strut member 130 made of circular shaped steel plate an is provided with a pair of straight portions 130*a* which are positioned opposite one another and a pair of circular arc portions 130*b* as in the arrangement of FIG. 1. A first projection portion 131 is formed at a center portion of each straight portion 130*a*, respectively. A pair of second projection portions 132 and a pair of third projection portions 133 are formed on the straight portions 130*a* so as to be positioned along a diagonal line with respect to one another. The first projection portions 131 have a bent portion 131*a* bent outwardly at a free end so as to extend along an inner surface of the soluble core 121. The first projection portions 131 determine the position of the soluble core 121 in the direction of the arrow A (front-rear direction) and in the direction of the Arrow C (upper-lower direction). The second projection portions 132 have a curved-holding portion 132*a* bent inwardly at its end so as to extend along an lower surface and inner surface of the soluble core 121, respectively. A vertical surface 132*b* of the curved holding portions 132*a*, which supports the inner surface of the soluble core 121, determines the position of the soluble core 121 in the direction of the Arrow B and a horizontal surface 132*c* of the curved holding portions 132*a* supports the lower surface of the soluble core 121 and determines the position of the soluble core 121 in the direction of the Arrow C, respectively. Further, the third projection portions 133 determine the position of the soluble core 121 in the direction of the Arrow C.

In the casting, the soluble core 121 is held to each projection portion of the strut member 130 by a snap-fit engagement so as to determine the core position in the A, B and C directions with respect to the strut member 130. In this condition, the strut member 130, holding the soluble core 121, is positioned to a setting portion of a mold 150*a* forming a punch mold 150. Then, by means of pouring hot water into the cavity 170, both the soluble core 121 forming the oil-cooling gallery 120 and the strut 130 holding the soluble core 121 are cast. A lower mold is designated by numeral 140 and the numeral 160 is a sliding mold which forms the cavity 170 with the punch mold 150 and the lower mold 140.

After the casting, the oil-inlet port 122 and the oil-outlet port 123 are formed in the piston 110 so that both ports 122, 123 face to the soluble core 121. By pouring water into the oil-inlet port 122, the soluble core 121 will melt whereby the oil-cooling gallery 120 will be formed. In an outer circumferential surface of the piston 110, the top-ring groove 111, the second-ring groove 113 and the oil-ring groove 116 are formed by a cutting process.

According to this embodiment, the position of the soluble core 121 is easily determined relative to the strut member 130 by each projection portion of the strut member 130 in the casting and it is able to reduce the manufacturing cost of the piston 110. Thereby, it is able to prevent sticking of the top-ring in high temperature operations. Further, since each projection portion of the strut member 130 is not cast in the skirt-shoulder portion 115*a* of the piston 110, it is able to delete unnecessary thickness and to decrease the weight of the piston 110. Since the hardness of the skirt-shoulder portion 115*a* is reduced, increase of the surface pressure of the skirt portion 115 is prevented by increasing hardness of the skirt-shoulder portion 115*a* and preventing the generation of the scuffing or marring by the increase of the hardness of the skirt-shoulder portion 115*a*.

The principles, preferred embodiments and modes of operation of the present invention have been described in the foregoing application. The invention which is intended to be protected herein should not, however, be construed as limited to the particular forms disclosed, as these are to be regarded as illustrative rather than restrictive. Variations and changes may be made by those skilled in the art without departing from the spirit of the present invention. Accordingly, the foregoing detailed description should be considered exemplary in nature and not limited to the scope and spirit of the invention as set forth in the appended claims.

What is claimed is:

1. A method for manufacturing a piston of an internal combustion engine comprising;

holding a soluble core to a plurality of first projection portions and a plurality of second projection portions formed in a strut member, said first projections having a bent portion bent outwardly and extending along a face of said soluble core and said second projection portions having a cutting portion, casting said strut member holding said soluble core in said piston subsequent to setting said strut member at an inside of an aggregate of an inorganic fiber positioned in a lower mold, reinforcing a circumference of a top-ring groove of the piston by reinforcing said aggregate of inorganic fiber, forming an oil-cooling gallery and melting away said soluble core by pouring water into said mold.

2. A method for manufacturing a piston of an internal combustion engine as recited in claim 1, wherein said strut member is provided with a pair of straight portions which are located opposite each other and a pair of circular arc portions which are located opposite each other, said first projection portions and said second projection portions being formed on said straight portions of said strut member.

3. A method for manufacturing a piston of an internal combustion engine as recited in claim 1, wherein said soluble core is held to said first and second projections of said strut member by a snap-fit engagement.

4. A method for manufacturing a piston of an internal combustion engine as recited in claim 3, wherein said first projection portions are engaged with an inner surface of said soluble core and said second projection portions are engaged with an outer surface of said soluble core.

5. A method for manufacturing a piston of an internal combustion engine as recited in claim 4, wherein said cutting portion of said second projection portions are provided with a first cutting surface extending in an axial direction of said piston and a second cutting surface extending in a diametrical direction of said piston.

6. A method for manufacturing a piston of an internal combustion engine comprising;

holding a soluble core to a plurality of first projection portions and a plurality of second projection portions and a plurality of third projection portions formed in a pair of straight portions of a strut member, said first projections having a bent portion bent outwardly so as to extend along an inner face of said soluble core and said second projection portions having a curved holding portion bent inwardly so as to extend along a lower surface and an inner surface of said soluble core, casting said strut member holding said soluble core in said piston, melting away said soluble core and forming an oil-cooling gallery by pouring water into said mold.

7. A method for manufacturing a piston of an internal combustion engine as recited in claim 6, wherein said strut member is provided with a pair of said straight portions which are located opposite each other and a pair of circular arc portions which are opposite each other, said first projection portions formed on a center of said straight portions and said second projection portions and said third projection portions formed on said straight portions so as to be positioned along a diagonal line.

8. A method for manufacturing a piston of an internal combustion engine as recited in claim 6, wherein said soluble core is held to said first and second projections of said strut member by a snap-fit engagement.

9. A method for manufacturing a piston of an internal combustion engine as recited in claim 8, wherein said first projection portions are engaged with inner, lower and upper surfaces of said soluble core and said second projection portions are engaged with said lower and inner surfaces of said soluble core and said third projection portions are engaged with said lower surface of said soluble core.

10. A method for manufacturing piston of internal combustion engine as recited in claim 9, wherein said curved-holding portions of said second projection portions are provided with a vertical surface and a horizontal surface.

* * * * *

UNITED STATES PATENT AND TRADEMARK OFFICE
CERTIFICATE OF CORRECTION

PATENT NO. : 4,891,875

DATED : January 9, 1990

INVENTOR(S) : S. HARA, et al.

It is certified that error appears in the above-identified patent and that said Letters Patent is hereby corrected as shown below:

On the title page, under item [19], "Soichi et al" should be --Hara et al.-- and in item [75], "Hara Soichi" should be --Soichi Hara--.

Signed and Sealed this

Twenty-fifth Day of December, 1990

*Attest:*

HARRY F. MANBECK, JR.

*Attesting Officer*

*Commissioner of Patents and Trademarks*